April 23, 1929.   C. W. ROOD   1,710,552
MOTOR VEHICLE HOIST
Original Filed Sept. 24, 1927   3 Sheets-Sheet 1

Inventor
Charles W. Rood
By Clarence A. O'Brien
Attorney

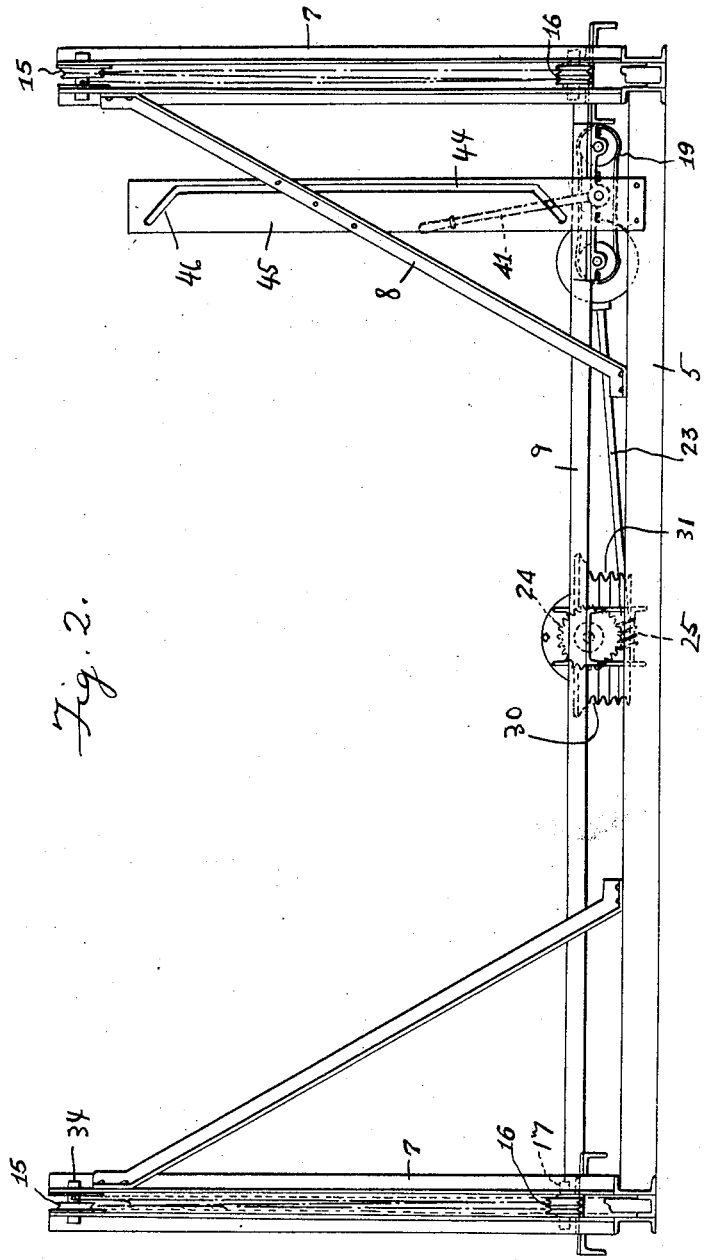

April 23, 1929.  C. W. ROOD  1,710,552
MOTOR VEHICLE HOIST
Original Filed Sept. 24, 1927    3 Sheets-Sheet 3
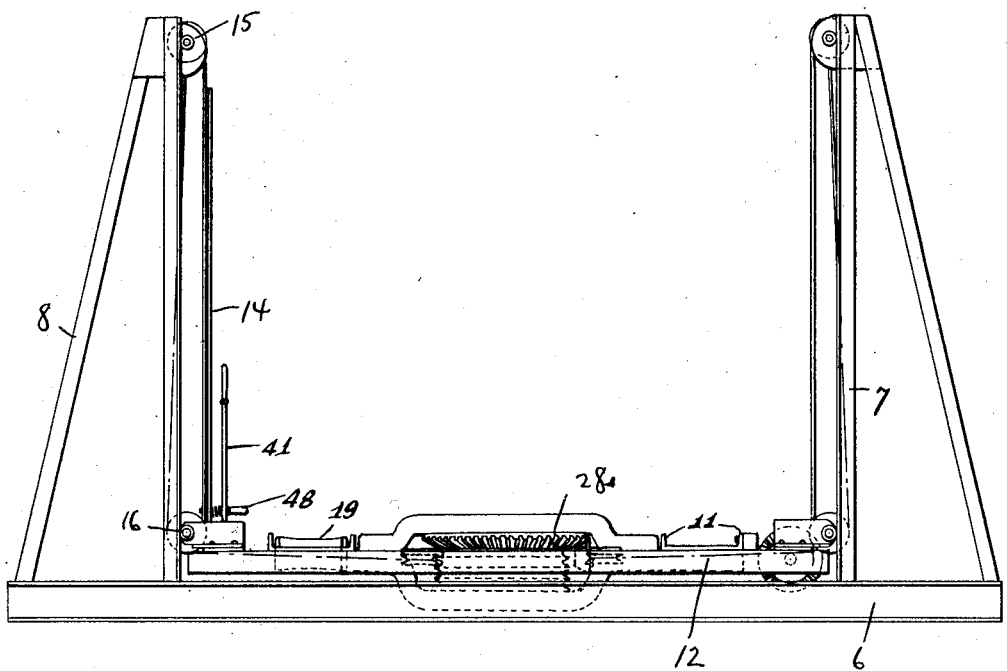
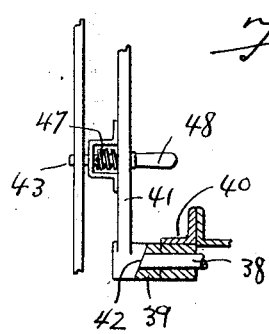
Inventor
Charles W. Rood
By Clarence A. O'Brien
Attorney Patented Apr. 23, 1929.

1,710,552

UNITED STATES PATENT OFFICE.

CHARLES W. ROOD, OF ORLANDO, FLORIDA, ASSIGNOR TO THE AUTOMOTIVE ELEVATOR CORPORATION, OF ORLANDO, FLORIDA.

MOTOR-VEHICLE HOIST.

Application filed September 24, 1927, Serial No. 221,724. Renewed February 9, 1929.

This invention relates to hoisting machines or elevators for raising motor vehicles such as automobiles or the like for the purpose of oiling, greasing, repairing or elevating the same from one floor of a building to another, and is admirably adapted for use by garages for storing the machines on upper floors.

The principal object of the invention is to provide means for operating the hoist through one of the drive wheels of the vehicle, thereby eliminating the necessity of furnishing a separate drive means for the hoisting apparatus.

Another object of the invention is to provide separate control means for the hoist independent of the control means for the drive wheel of the vehicle.

A further object is to employ the use of an automatic trip mechanism engageable with the hoist control means whereby to throw the same out of operative position whenever the hoist is raised or lowered to a predetermined position.

A still further object is to provide an apparatus of this character of simple and practical construction, strong and durable, efficient and reliable in performance, which may be readily erected for operative use at any desired location, which provides a safe and secure means for the hoisting of motor vehicles of various types, relatively inexpensive to manufacture, and otherwise well adapted for the purposes for which the same is intended.

Other objects and advantages reside in the special construction and combination of the various elements forming the invention, reference being had to the accompanying drawings forming a part hereof, wherein:—

Figure 2 is a side elevational view.

Figure 3 is an end elevational view, and,

Figure 4 is a detail of the pin carried by the clutch operating lever for the hoist which is arranged for engagement with the trip means for throwing said lever.

Figure 1:
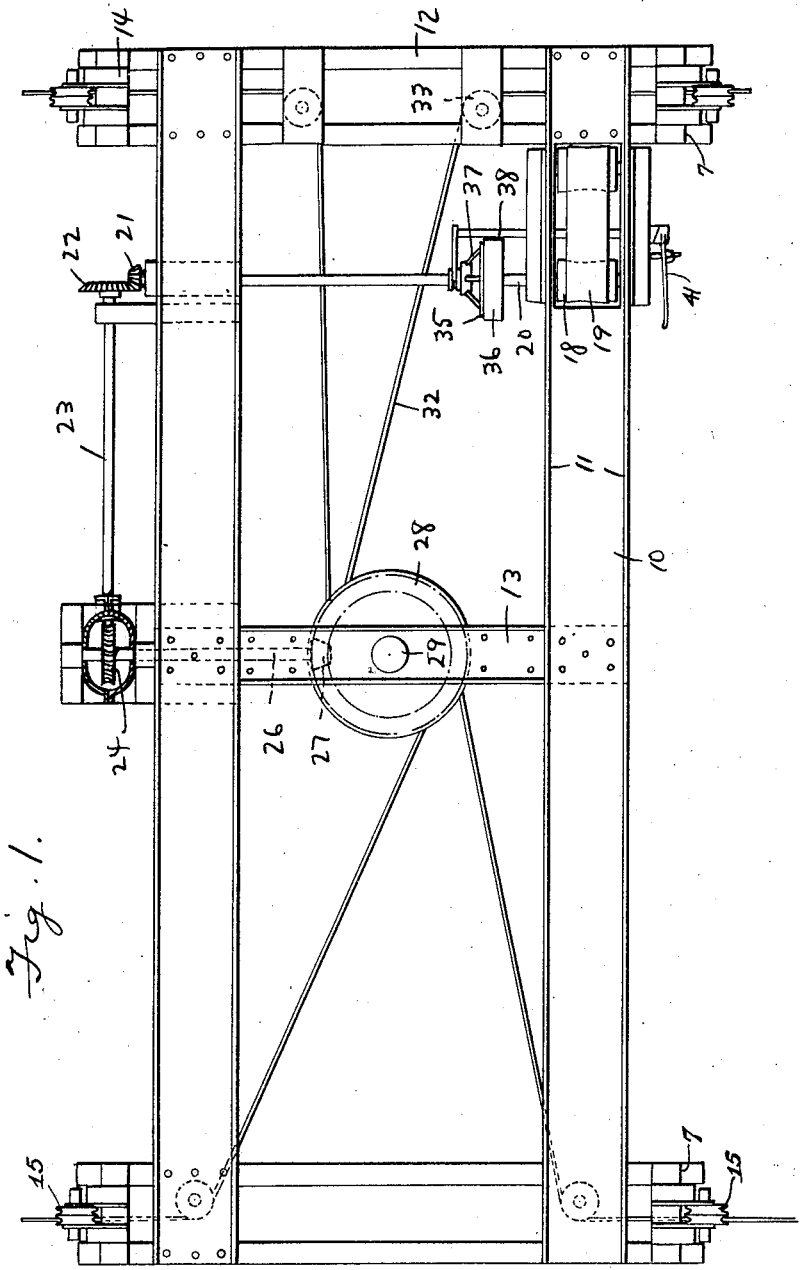
Figure 1 is a top plan view.

Referring to the drawings in detail, I provide a stationary hoist frame comprising a pair of longitudinal frame members 5 connected at their ends by transverse frame members 6, each end of the frame supporting a pair of vertically disposed upright members 7 supported in vertical position by braces 8. A movable platform 9 is arranged between the vertical members 7 comprising a pair of longitudinally extending tracks 10 having upwardly extending flanges 11 formed at each side thereof, constituting guides for the wheels of a vehicle which may be run upon the track and supported thereby. The tracks 10 are secured in spaced parallel relation at their ends by transverse frame members 12 and an intermediate transverse member 13 arranged substantially equi-distantly between the ends of the tracks. At each end of the movable platform I secure a pair of vertically extending posts 14, slidably disposed between the sides of the vertical members 7 of the stationary frame, so as to form a guide for said posts.

Pulley wheels 15 are rotatably mounted at the upper ends of each of the vertical members 7 and similar pulley wheels 16 are also rotatably mounted at the lower ends of each of the posts 14, said lower pulleys having the ends of the shaft 17 thereof extending outwardly and adapted to ride upon the adjacent edge of the vertical members 7 whereby to eliminate friction during the sliding vertical movement of the posts 14 with respect to said vertical members.

One of the tracks 10 is provided with an opening within which is rotatably mounted a pair of rollers 18 carrying an endless belt 19 adapted to be engaged by one of the drive wheels of the vehicle as the same is supported upon the track. A shaft 20 extends from one of said rollers having a bevel gear 21 mounted thereon engaging a similar gear 22 carried by a shaft section 23 on the opposite end of which is arranged a worm 24 operating a worm gear 25 mounted on a shaft section 26 extending toward the center of the platform and on which is arranged a drive pinion 27 for operating a ring gear 28 supported on a centrally disposed shaft 29 carried by the transverse frame member 13.

A drum 30 is also mounted on the shaft 29, said drum having a plurality of separately formed grooves 31 arranged circumferentially thereabout and adapted to form separately winding areas for cables 32 extending about the pulleys 15 and 16 at each corner of the upper end. The cables 32 extend about pulley wheels 33 at each end of the platform, over the lower pulley wheels 16, around the upper pulleys 15 and returned about the lower pulleys 16 and back again for attachment to the shaft 34 of the upper pulleys 15.

A clutch mechanism 35 is interposed in the shaft 20 comprising a drum member 36 secured at one section of the shaft and a frictional engaging clutch member 37 slidably carried on the other section of said shaft. The frictional engaging clutch member 37 is actuated by means of a transversely movable rod 38 extending under one of the tracks 10.

The outer end of the rod 38 carries a sleeve 39 slidably arranged in a bearing bracket 40, secured to the track, with the end of the rod having an operating lever 41 having one side of the hub thereof formed with an inclined base indicated at 42 engageable with a complementary formed base arranged on the adjacent end of the sleeve whereupon upon the throwing of the lever the rod 38 will be moved in a transverse direction.

A pin 43 is carried by the lever slidably disposed in a slotted opening 44 formed in a vertically disposed post 45, the opposite ends of said slot being offset as indicated at 46 whereupon to cause the lever 41 to be moved in a direction for operating the rod 38 upon engagement of the pin with said offset sections of the slot. This construction enables the clutch 35 to be thrown out of engagement whenever the platform reaches a predetermined upper or lower position.

The pin 43 is yieldably held in engagement with the slots 44 by means of a spring 47 carried by the pin and held against the lever 41 for normally forcing the pin in engaged position. When desired to release the pin from engagement with the slot, for any purpose, the handle 48 formed on the end of the pin may be pulled outwardly against the tension of the spring thereby permitting the pin 43 to be removed.

In the operation of the device, after the vehicle has been moved upon the track 10, with one of the drive wheels disposed upon the belt 19, the opposite drive wheel is securely chocked to prevent movement of the vehicle and upon moving the lever 41 into a position to cause the engagement of the clutch 35, the apparatus is then in position for operation. The drive mechanism of the vehicle is placed in low gear, which thereupon causes the movement of the rollers 18 so as to operate the drum 30 through the various shafts and gears. The platform is accordingly hoisted upwardly until the pin 43 reaches the offset section 46 of the slots 44 whereupon the clutch lever 41 is moved into a position for throwing the clutch 35 out of engagement thus causing the platform to stop. In order to lower the platform, the same operation is followed, it being obvious that as soon as the pin 43 reaches the offset section of the slot 43 at the lower end thereof, that the lever 41 will also be thrown into a position for disengaging the clutch 35.

The worm gearing will operate to hold the load on the elevator at all times, regardless of whether or not the clutch is engaged or disengaged, thereby assuring safety in the operation of the hoist and protecting the platform against the accidental lowering of the same should motor of the vehicle become stalled.

It is obvious that the invention is susceptible of various changes and modifications without departing from the spirit or scope of the invention as hereinafter claimed or sacrificing any of its advantages, and I accordingly claim all such forms of the device to which I am entitled.

I claim:—

1. In an apparatus of the class described, a stationary frame, a movable platform carried thereby and adapted to support a vehicle thereon, operating means for the platform operatively engageable with one of the drive wheels of the vehicle, said operating means having a clutch mechanism interposed therein, a clutch control lever for said operating means, and means engageable by the lever for automatically controlling the engagement of the clutch whereby to control the movement of said platform.

2. In an apparatus of the class described, a stationary frame, a movable platform carried thereby and adapted to support a vehicle thereon, operating means for the platform operatively engageable with one of the drive wheels of the vehicle, clutch control means for said operating means, having an operating lever and lever throw means adapted to actuate the lever upon a predetermined movement of the platform whereby to limit the movement of said platform in opposite directions.

3. In a vehicle hoist, a stationary frame, a platform mounted for vertical movement thereon and adapted to support the vehicle, rollers mounted on the platform engageable with one of the drive wheels of the vehicle, a drum carried by the platform, cables operatively connecting the drum with the stationary frame, operating means for the drum connected with said rollers, a clutch interposed in said operating means, an operating lever for the clutch and means engageable by the lever for actuating the same at certain predetermined elevated positions of the platform.

4. In a vehicle hoist, a stationary frame, a platform mounted for vertical movement thereof and adapted to support the vehicle, rollers mounted on the platform engageable with one of the drive wheels of the vehicle, a drum carried by the platform, cables operatively connecting the drum with the stationary frame, operating means for the drum connected with said rollers, a clutch interposed in said operating means, an operating lever for the clutch, and means engageable by the lever for actuating the same at a predetermined upper and lower position of the platform.

5. In a vehicle hoist, a stationary frame, a platform mounted for vertical movement thereof and adapted to support the vehicle, rollers mounted on the platform engageable with one of the drive wheels of the vehicle, a drum carried by the platform, cables operatively connecting the drum with the stationary frame, operating means for the drum connected with said rollers, a clutch interposed in said operating means, an operating lever for the clutch, a pin yieldably carried by the lever, and means releasably engageable with said pin for actuating the lever at predetermined upper and lower positions of the platform.

In testimony whereof I affix my signature.

CHARLES W. ROOD.